(12) United States Patent
Kubohara

(10) Patent No.: US 7,441,050 B2
(45) Date of Patent: Oct. 21, 2008

(54) DATA PROCESSING SYSTEM, DATA PROCESSING METHOD, COMPUTER-READABLE STORAGE MEDIUM, AND DISK DRIVE

(75) Inventor: Ryuki Kubohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 11/232,542

(22) Filed: Sep. 22, 2005

(65) Prior Publication Data

US 2006/0224788 A1 Oct. 5, 2006

(30) Foreign Application Priority Data

Mar. 31, 2005 (JP) ............................. 2005-104396

(51) Int. Cl.
*G06F 3/00* (2006.01)
*G06F 13/00* (2006.01)
(52) U.S. Cl. ..................................... 710/5; 710/3; 710/9
(58) Field of Classification Search ........................ None
See application file for complete search history.

(56) References Cited

U.S. PATENT DOCUMENTS

2005/0268177 A1* 12/2005 John ........................... 714/47

FOREIGN PATENT DOCUMENTS

| JP | 5-20350 | 1/1993 |
| JP | 9-282223 | 10/1997 |
| JP | 11-194969 | 7/1999 |

* cited by examiner

*Primary Examiner*—Tariq R. Hafiz
*Assistant Examiner*—Scott Sun
(74) *Attorney, Agent, or Firm*—Greer, Burns & Crain, Ltd.

(57) ABSTRACT

In a data processing system that processes serial data transferred from a processor formed as one chip and transmits the resultant data to another chip, a data output processing unit that processes serial data transferred from a single processor or a plurality of processors comprises a bank designation serial data holder that temporarily holds bank designation serial data with which an address of a bank is designated and which is transferred from the processor, and a bank designation serial data comparator that compares a designative value represented by current bank designation serial data, which is currently held, with a designative value represented by the last bank designation serial data that is immediately previously held. If the two designative values are verified to agree with each other, the current bank designation serial data is not transmitted but only current register designation serial data with which a register is designated is transmitted. On the other hand, a data processing method in accordance with the present invention to be implemented using the data processing system, a computer-readable storage medium in which a program for implementing the data processing method in accordance with the present invention in a computer is stored, and a disk drive to which the present invention is applied, are also provided.

11 Claims, 10 Drawing Sheets

Fig.4

(a) SERIAL DATA OF 20 BITS

| ADDRESS OF MEMORY LOCATION | 13 | 12~08 | 07~00 |
|---|---|---|---|
| DATA | R/W | ADDRESS DATA | REGISTER DATA |

(b) SERIAL DATA OF 16 BITS

| ADDRESS OF MEMORY LOCATION | 0F | 0E~08 | 07~00 |
|---|---|---|---|
| DATA | R/W | ADDRESS DATA | REGISTER DATA |

ONLY WHEN ADDRESS BITS REPRESENTING A MEMORY LOCATION RANGING FROM 08 TO 0E ARE ALL SET TO "1", REGISTER DATA IS REGARDED AS DATA REPRESENTING A BANK DESIGNATIVE VALUE

DATA PROCESSING SYSTEM, DATA PROCESSING METHOD, COMPUTER-READABLE STORAGE MEDIUM, AND DISK DRIVE

BACKGROUND OF THE INVENTION

1. Field of the Invention

The present invention relates to a data processing system and a data processing method for processing serial data, which is transferred over a serial bus in order of issuance of a data output instruction from a single processor or a plurality of processors formed as one chip, and transmitting the resultant data to another chip, and also relates to a computer-readable storage medium and a disk drive.

For example, the present invention is applied to a data processing system adapted to a disk drive (for example, a magnetic disk drive) comprising a disk driver that drives a disk, such as a magnetic disk, and a head driver that drives a head. For control of various motions including a motion for writing information (data) on a disk using a head and a motion for reading information from the disk, the data processing system efficiently processes a large amount of serial data transferred over a serial bus from a single processor or a plurality of processors formed as one chip, and transmits the resultant data to an output control circuit (for example, a read channel (normally abbreviated to RDC)) that is formed as another chip for control of reading or writing.

2. Description of the Related Art

Generally, in storage devices including a disk drive, a main memory is accessible to a processor formed as one chip. In efforts to apparently increase the storage capacity of the main memory, a plurality of memory banks (which hereinafter may be simply called banks) is included in a read channel or the like, which is formed as another chip, for registering data. The memory banks are appropriately switched in use.

For example, assume that serial data is transferred in units of a block from a main memory accessible to a processor formed in one chip, and that one block of serial data comprises twenty bits including eleven address bits, eight data bits, and one reading/writing control bit (R/W bit). Furthermore, the serial data of twenty bits shall be serial data whose four high-order address bits are fixed, whose seven low-order address bits are changeable, and whose eight data bits are changeable. If ten blocks of such serial data are transmitted to another chip, it takes a long time, calculated simply as a product of 20 bits by 10 serial clock cycles, to record the serial data blocks in registers or the like in another chip.

On the other hand, in order to use part of the serial data as bank data, the four high-order bits are separated from the address bits and used to represent an address of a bank (in which serial data of sixteen bits is stored). Seven bits are used as address bits to record data in a register in another chip. In this case, after an address of a bank in which sixteen bits are stored is designated, it takes only the time, calculated simply as a product of 16 bits by 10 serial clock cycles, to record the blocks of data of 16 bits in registers.

In short, assuming that ten blocks of serial data of twenty bits (register designation serial data) transferred from one chip are recorded in registers in another chip, it takes a long time, calculated simply as a time required for registering 200 bits. In contrast, assuming that part (for example, four bits) of serial data is used as serial data (bank designation serial data) with which an address of a bank is designated, it takes only the time, calculated simply as the time required for registering 160 bits. Therefore, when part of the serial data transferred from one chip is treated as bank data, it has the advantage of shortening of the time required for recording serial data blocks in registers in another chip.

Assume that a plurality of processors is formed in one chip, designed as a large-scale integration (LSI) circuit, which treats serial data transferred from one chip as bank data. Under the circumstances, if the plurality of processors accesses data, the data may be stored in registers having consecutive addresses. As the other processor may modify an address of a bank, every time data is transferred in units of a block, an address of a bank must be designated.

Typically, as far as a conventional data processing system that processes serial data transferred from two processors incorporated in a disk drive or the like is concerned, a control unit for controlling various motions including reading and writing motions to be performed in the disk drive is constructed as one chip. The control unit comprises a microcontroller unit (MCU) that is one processor which manages a main memory and which has a memory conversion ability and a memory protection ability, a digital signal processor (DSP) that is the other processor which performs arithmetic operations on a digital signal (data) at a high speed, and a sequencer that transfers data sent from the MCU and DSP over a common serial bus. The MCU converts parallel data into serial data, and transfers the serial data to the sequencer. The DSP performs arithmetic operations on parallel data so as to convert the parallel data into serial data, and transfers the serial data to the sequencer. The sequencer transfers serial data in units of a block over the serial bus in order of issuance of a data output instruction from the MCU and DSP.

Furthermore, the conventional data processing system includes a data output processing unit that processes and transmits serial data transferred from the sequencer over the serial bus. The data output processing unit includes a data output circuit that serves as a buffer circuit mediating between one chip and another chip. The data output circuit receives serial data directly from the control unit, and transmits the serial data to an output control circuit in another chip in a through manner (without a change in the contents of data).

The output control circuit is constituted by a read channel (RDC) for use in controlling reading or writing of data from or into a disk drive. The output control circuit has the ability to record serial data, which is sent from the data output processing unit, in a bank designative register so that the serial data can be used as bank data.

However, assuming that serial data is accessed by the plurality of processors including the MCU and DSP, and recorded in the same bank designative register, if data accessed by the MCU and data accessed by the DSP are mixed, as the other processor (for example, the MCU) may modify an address of a bank, a bank address must be designated at every time of transmitting data in units of a block.

On the other hand, even when one processor is formed in one chip, if other serial data is mixed due to an interrupt caused by an external timer, an address of a bank may be modified. Therefore, the bank address must be designated every time.

In either case, bank designation serial data is transmitted over the serial bus in order to select an address of a bank. Thereafter, register designation serial data with which a register in other chip is designated must be transmitted. In short, in either case, the bank designation serial data and register designation serial data must be transmitted in pairs. Therefore, in the conventional data processing system, as a bank address must be designated every time, it takes a long time to transfer serial data.

On the other hand, when two or more register designation serial data items are transmitted successively, a currently designated address of a bank may be instantaneously modified. Therefore, bank designation serial data is needed every time. When the register designation serial data is transmitted without production of bank designation serial data, if an unexpected interrupt occurs, a completely different register may be designated.

Patent Documents 1 to 3 related to the foregoing conventional disk processing system will be presented below as related art literatures. Patent Document 1 discloses a vector processing system in which an address of an access code recorded in a vector register is detected, and whether the address is accessed continuously is determined. At this time, if the address is recognized to be accessed continuously, a data field of address information on the address is omitted. In the vector processing system, the continuity of addresses in a main memory is emphasized. However, an address of a bank in which current serial data is stored is not compared with an address of a bank in which immediately preceding serial data is stored.

Patent Document 2 discloses a memory control system in which, when successive requests for the same page are recorded, a plurality of accesses is successively achieved quickly in units of a page. Thus, a fast memory system is constructed. However, in the memory control system, an address of a bank in which current serial data is stored is not compared with an address of a bank in which immediately preceding serial data is stored.

Patent Document 3 discloses a memory control circuit that, when memory writing access to the same address is continuously requested, command/address information contained in a succeeding memory request is compared with command/address information which is contained a preceding memory request and with which an accessed bank is designated. If the pieces of command/address information disagree with each other, designation as a busy bank is canceled. Memory access is then performed. If the pieces of command/address information agree with each other, data to be written in the memory is updated with data to be written in response to the succeeding memory request. In reality, memory access is executed only once. However, in the memory control circuit, an address of a bank in which current serial data is stored is not compared with an address of a bank in which immediately preceding serial data is stored.

Consequently, in any of Patent Documents 1 to 3, when serial data transferred from one or two or more processors incorporated in a disk drive is processed, the same problems as those underlying the conventional data processing system take place.

1. Patent Document 1: Japanese Unexamined Patent Publication (Kokai) No. 5-020350
2. Patent Document 2: Japanese Unexamined Patent Publication (Kokai) No. 9-282223
3. Patent Document 3: Japanese Unexamined Patent Publication (Kokai) No. 11-194969

SUMMARY OF THE INVENTION

The present invention addresses the foregoing problems. An object of the present invention is to provide a data processing system and a data processing method capable of quickly recording serial data in a register in another chip by making the time, which is required for transfer of the serial data, shorter than the conventionally required time, and capable of preventing recording of register designation serial data, which is transmitted to another chip, in a completely different register, and to provide a computer-readable storage medium and a disk drive.

In order to accomplish the above object, a data processing system in accordance with the first aspect of the present invention comprises a data output processing unit that processes and transmits serial data which is transferred in units of a block over a common serial bus in order of issuance of a data output instruction from a plurality of processors. The serial data includes first serial data (that is, register designation serial data) containing usable information, and second serial data (that is, bank designation serial data) with which an address of a bank, in which the first serial data is stored, is designated. The data output processing unit comprises a second serial data holding means for temporarily holding the second serial data included in the serial data transferred from the plurality of processors, and a second serial data comparing means for comparing a designative value represented by current second serial data, which is currently held in the second serial data holding means, with a designative value represented by the last second serial data that is immediately previously held in the second serial data holding means. If the second serial data comparing means verifies that the designative value of the current second serial data agrees with the designative value of the last second serial data, the current second serial data is not transmitted but only the first serial data included in the block including the current second serial data is transmitted.

It should be noted that, in the present invention, the second serial data (i.e., bank designation serial data) is transferred first, and subsequently, the first serial data (i.e., register designation serial data) is transferred second, in order of issuance of a data out instruction from a plurality of processors (or one processor).

Preferably, in the data processing system according to the first aspect of the present invention, if the second serial data comparing means verifies that the designative value of the current second serial data disagrees with the designative value of the last second serial data, both the current second serial data and the first serial data included in the block including the current second serial data are transmitted.

On the other hand, a data processing system according to the second aspect of the present invention comprises a data output processing unit that processes and transmits serial data which is transferred in units of a block over a serial bus in order of issuance of a data output instruction from one processor or issuance of a data output instruction responsive to an external interrupt. The serial data includes first serial data containing usable information, and second serial data with which an address of a bank, in which the first serial data is stored, is designated. The data output processing unit comprises a second serial data holding means for temporarily holding the second serial data included in the serial data transferred from the processor, and a second serial data comparing means for comparing a designative value represented by current second serial data, which is currently held in the second serial data holding means, with a designative value represented by the last second serial data which is immediately previously held in the second serial data holding means. If the second serial data comparing means verifies that the designative value of the current second serial data agrees with the designative value of the last second serial data, the current second serial data is not transmitted but only the first serial data included in the block including the current second serial data is transmitted.

Preferably, in the data processing system according to the second aspect of the present invention, if the second serial data comparing means verifies that the designative value of the current second serial data disagrees with the designative value of the last second serial data, both the current second serial data and the first serial data included in the block including the current second serial data are transmitted.

On the other hand, a data processing method in accordance with the present invention is concerned with processing and transmission of serial data transferred over a serial bus in order of issuance of a data output instruction from at least one processor. The serial data includes first serial data containing usable information and second serial data with which an address of a bank, in which the first serial data is stored, is designated. The data processing method comprises: a step of temporarily holding that second serial data included in the serial data transferred from the processor; a step of comparing a designative value represented by current second serial data, which is currently held, with a designative value represented by the last second serial data that is immediately previously held; and a step of, if the designative value of the current second serial data agrees with the designative value of the last second serial data, transmitting only the first serial data included in the block including the current second serial data without transmitting the current second serial data.

In short, according to the present invention, first, when serial data transferred in order of issuance of a data output instruction from a plurality of processors including an MCU and a DSP is processed, second serial data (that is, bank designation serial data) with which an address of a bank is designated and which is included in the serial data is temporarily held in a register or the like. A designative value represented by current second serial data that is currently held is compared with a designative value represented by the last second serial data that is immediately previously held. If the designative value of the current second serial data agrees with the designative value of the last second serial data, the current second serial data is not transmitted but only the first serial data (that is, register designation serial data) paired with the current second serial data is transmitted.

Consequently, according to the first technique in which the present invention is implemented, an amount of bank designation serial data to be transmitted is smaller than a conventional one, and the time required for transferring serial data is shorter than a conventional one. Therefore, recording of serial data in a register in a chip other than a chip accommodating a plurality of processors can be speeded-up. Furthermore, in this case, current bank designation serial data is compared with the last bank designation serial data in order to verify whether or not the current bank designation serial data should be transmitted. When register designation serial data is transmitted to another chip, even if the other processor modifies an address of a bank, the register designation serial data is prevented from being recorded in a completely different register.

Further, according to the present invention, second, when serial data transferred in order of issuance of a data output instruction from one processor or issuance thereof responsive to an external interrupt is processed, bank designation serial data included in the serial data is temporarily held in a register or the like. A designative value represented by current bank designation serial data that is currently held is compared with a designative value represented by the last bank designation serial data that is immediately previously held. If the designative value of the current bank designation serial data agrees with the designative value of the last bank designation serial data, the current bank designation serial data is not transmitted but only register designation serial data paired with the current bank designation serial data is transmitted.

Consequently, according to the second technique in which the present invention is implemented, similarly to the first technique, an amount of bank designation serial data is smaller than a conventional one, and the time required for transfer of serial data is shorter than a conventional one. Therefore, recording of serial data in a register in a chip other than a chip in which one processor is formed can be speeded-up. Furthermore, even in this case, similarly to the first technique, current bank designation serial data is compared with the last bank designation serial data in order to verify whether or not the current bank designation serial data should be transmitted. Therefore, when register designation serial data is transmitted to another chip, even if an address of a bank is modified in response to an external interrupt, the register designation serial data is prevented from being recorded in a completely different register.

BRIEF DESCRIPTION OF THE DRAWINGS

The above object and features of the present invention will be more apparent from the following description of some preferred embodiments with reference to the accompanying drawings, wherein:

FIG. 4 shows an example of a data format for serial data employed in the embodiment of the present invention;

DESCRIPTION OF THE PREFERRED EMBODIMENTS

Figure 1:
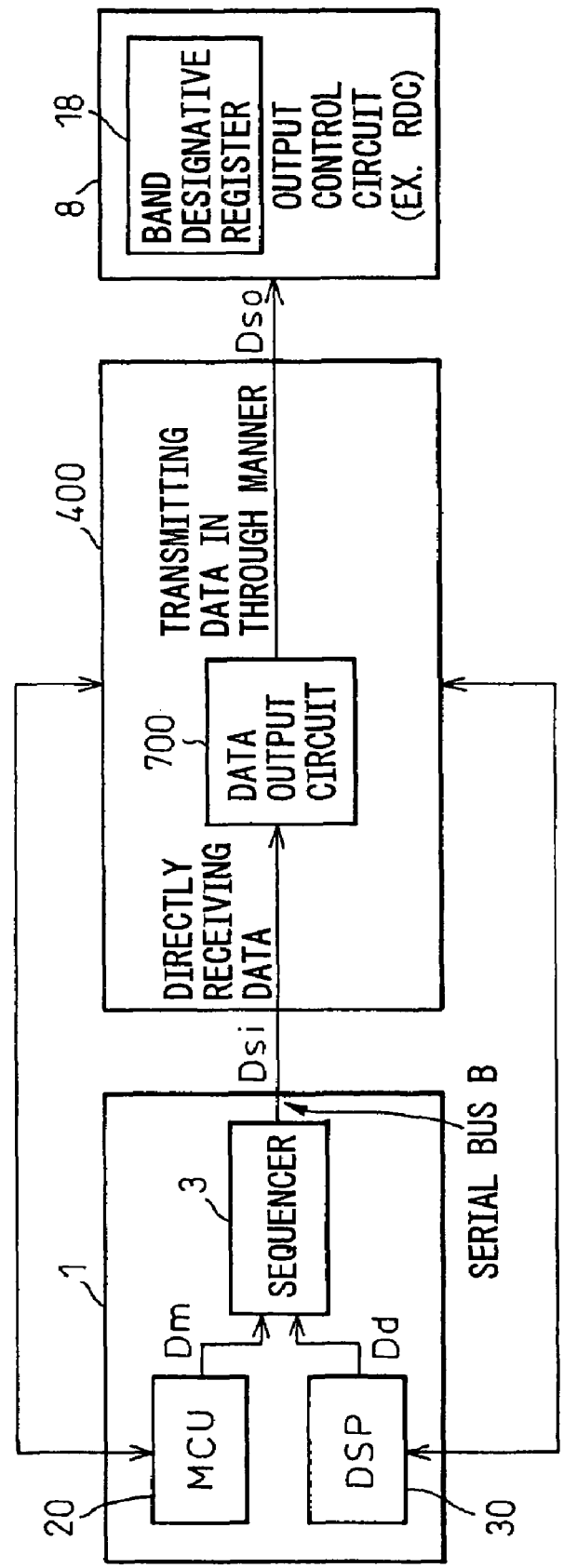
FIG. 1 is a block diagram showing the configuration of a conventional data processing system.

Before describing a preferred embodiment of a data processing system in accordance with the present invention, a conventional data processing system and underlying problems will be described with reference to the appended drawing (FIG. 1).

FIG. 1 is a block diagram showing the configuration of the conventional data processing system. Schematically shown is the configuration of the conventional data processing system for processing serial data transferred from two processors incorporated in a disk drive or the like.

In the conventional data processing system shown in FIG. 1, a control unit 1 that controls various motions including reading and writing motions performed in a disk drive is constructed with one chip. The control unit 1 comprises an MCU 20, that is one processor, which manages a main memory and which has a memory conversion ability and a memory protection ability, a DSP 30, that is the other processor, which performs arithmetic operations on a digital signal (data) at high speed, and a sequencer 3 that transfers data sent from the MCU 20 and DSP 30 over a common serial bus B. The MCU 20 processes parallel data so as to convert it into serial data Dm, and transfers the serial data Dm to the sequencer 3. The DSP 30 performs arithmetic operations on parallel data so as to convert it into serial data Dd, and transfers the serial data Dd to the sequencer 3. The sequencer 3 transfers serial data Dsi in units of a block over the serial bus B in order of issuance of a data output instruction from the MCU 20 and DSP 30.

Furthermore, the conventional data processing system shown in FIG. 1 comprises a data output processing unit 400 that processes and transmits the serial data Dsi transferred from the sequencer 3 over the serial bus B. The data output processing unit 400 is normally formed in the chip with which the control unit 1 is constructed, but may be formed outside the chip. Moreover, the data output processing unit 400 includes a data output circuit 700 serving as a buffer circuit mediating between one chip and another chip. The data output circuit 700 receives the serial data Dsi directly from the control unit 1, and transmits the serial data to an output control circuit 8, which is formed in another chip, in a through manner.

The output control circuit 8 is constituted by a read channel (RDC) that is used to control reading and writing performed by a disk drive. The output control circuit 8 has the ability to record serial data Dso, which is sent from the data output processing unit 400, in a bank designative register 18 so as to use the serial data Dso as bank data.

However, assuming that serial data is accessed by a plurality of processors including an MCU and a DSP and then recorded in the same bank designative register 18, when the data accessed by the MCU and the data accessed by the DSP are mixed, the other processor (for example, MCU) may modify an address of a bank. Every time data is transmitted in units of a block, a bank address must be designated.

On the other hand, even when only one processor is formed in one chip, if other serial data is mixed in response to an interrupt caused by an external timer, an address of a bank may be modified. The address of a bank must therefore be designated every time.

In either case, bank designation serial data is transmitted over the serial bus B in order to select an address of a bank. Thereafter, register designation serial data with which a register in another chip is designated must be transmitted. In short, in either case, the bank designation serial data and the register designation serial data must be transmitted in pairs. Consequently, the conventional data processing system suffers a drawback that it takes a long time to transfer serial data because an address of a bank must be designated every time.

On the other hand, when two or more register designation serial data items are successively transmitted, a currently designated address of a bank may be instantaneously changed to another. Therefore, bank designation serial data must be transmitted every time. Herein, assuming that bank designation serial data is not produced but register designation serial data alone is transmitted, if an unexpected interrupt occurs, the register designation serial data may be recorded in a completely different register.

The preferred embodiment of the data processing system in accordance with the present invention that has been proposed in efforts to solve the foregoing problems will be described below with reference to drawings (FIG. 2 to FIG. 10).

Referring to the appended drawings (FIG. 2 to FIG. 10), the configuration of the preferred embodiment of the present invention and the operations to be performed therein will be described below.

Figure 2:
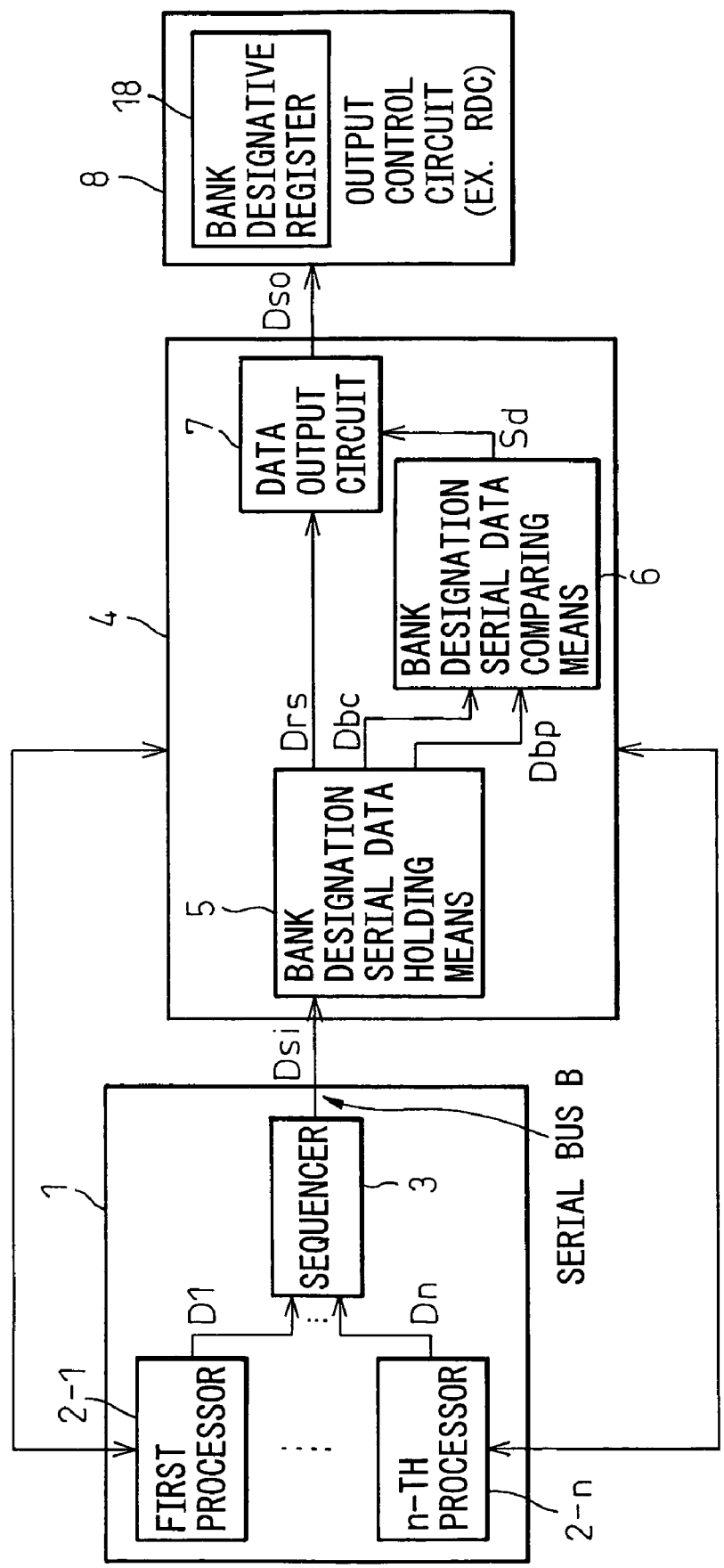
FIG. 2 is a block diagram showing the configuration of a data processing system in accordance with an embodiment of the present invention.

FIG. 2 is a block diagram showing the configuration of a data processing system in accordance with the embodiment of the present invention. Herein, the configuration of the data processing system in accordance with the present invention that processes serial data transferred from a plurality of processors (first processor 21 to n-th processor 2-n where n denotes a positive integer equal to or larger than 2) included in a disk drive is schematically shown in FIG. 2. Incidentally, hereinafter, the same reference numerals will be assigned to components identical to the aforesaid ones.

Even in the data processing system in accordance with the embodiment shown in FIG. 2, similarly to the one shown in FIG. 1, a control unit 1 that controls various motions including reading and writing motions performed in the disk drive is constructed as one chip. The control unit 1 comprises a plurality of processors including a first processor 2-1 to n-th processor 2-n, and a sequencer 3 that transfers data blocks D1 to Dn sent from the plurality of processors over a common serial bus B. The first processor 2-1 to the n-th processor 2-n process parallel data so as to convert it into serial data, and transfer the serial data to the sequencer 3. The sequencer 3 transfers serial data Dsi in units of a block over the serial bus B in order of issuance of a data output instruction from the plurality of processors. Preferably, the serial data Ds includes register designation serial data (first serial data) containing information usable as bank data, and bank designation serial data (second serial data) with which an address of a bank in which the register designation serial data is stored is designated.

Furthermore, the data processing system shown in FIG. 2 comprises a data output processing unit 4 that processes the serial data Dsi transferred from the sequencer 3 over the serial bus B and transmits the resultant data. The data output processing unit 4 is normally formed in the chip with which the control unit 1 is constructed, but may be formed outside the chip.

Furthermore, the data output processing unit 4 comprises a bank designation serial data holding means 5 for temporarily holding bank designation serial data (i.e., second serial data) included in the serial data Dsi transferred from the plurality of processors, and a bank designation serial data comparing means 6 for comparing a designative value represented by current bank designation serial data (i.e., current second serial data) Dbc, which is currently held in the bank designation serial data holding means 5, with a designative value represented by immediately preceding bank designation serial data (i.e., preceding second serial data) Dbp that is immediately previously held in the bank designation serial data holding means 5.

The data output processing means 4 further comprises a data output circuit 7 serving as a buffer circuit that mediates between one chip and another chip. The data output circuit 7 receives register designation serial data Drs that is transferred while being passed through the bank designation serial data holding means 5 as it is, and selectively receives current bank designation serial data Dbc which the bank designation serial data comparing means 6 has checked to see if it should be transferred. The data output circuit 7 then transmits the received data to the output control circuit 8 in another chip.

The output control circuit 8 is, as described in conjunction with FIG. 1, constituted by a read channel (RDC) that is used to control reading and writing performed by the disk drive. The output control circuit 8 has the ability to record serial data Dso, which is sent from the data output processing unit 4, in a bank designative register 18 so that the serial data can be used as bank data.

Preferably, the bank designation serial data holding means 5 is constituted by a serial register in which bank designation serial data (Dbc or Dbp) transferred from the plurality of processors is stored temporarily. On the other hand, register designation serial data Drs received while being paired with the bank designation serial data is not stored in the serial register that is the bank designation serial data holding means 5 but transferred to the data output circuit 7 as it is.

Preferably, the bank designation serial data comparing means 6 is constituted by a digital comparator that includes an exclusive OR circuit for comparing a designative value represented by current bank designation serial data Dbc, which is currently held in the bank designation serial data holding means 5, with a designative value represented by the last bank designation serial data Dbp that is immediately previously held in the bank designation serial data holding means 5. The digital comparator compares each of the bits constituting the current bank designation serial data Dbc, which is currently stored in the serial register, with each of the bits constituting the last bank designation serial data Dbp that is immediately previously stored in the serial register.

As a result of comparison of the designative values of the two bank designation serial data items, the bank designation serial data comparing means 6 may verify that the designative value of the current bank serial data Dbc agrees with the designative value of the last bank designation serial data Dbp. In this case, the current bank designation serial data Dbc is not transmitted (result-of-comparison output signal Sd is not transmitted) but only register designation serial data paired with the current bank designation serial data is transmitted from the data output circuit 7.

On the other hand, as a result of comparison of the designative values of the two bank designation serial data items, the bank designation serial data comparing means 6 may verify that the designative value of the current bank designation serial data Dbc disagrees with the designative value of the last bank designation serial data Dbp. In this case, similarly to the conventional data processing system, the current bank designation serial data is transmitted from the data output circuit 7 (result-of-comparison output signal Sd is transmitted), and the register designation serial data paired with the current bank designation serial data is transmitted from the data output circuit 7.

According to the embodiment shown in FIG. 2, even when serial data blocks sent from a plurality of processors are mixed and transferred, an amount of bank designation serial data is smaller than a conventional one, and the time required for transfer of serial data is shorter than a conventional one. Consequently, recording of data in the output control circuit that is a read channel or the like can be speeded up. Furthermore, according to the embodiment shown in FIG. 2, current bank designation serial data is compared with the last bank designation serial data in order to verify whether or not the current bank designation serial data should be transmitted. When register designation serial data is transmitted to the output control circuit that is a read channel or the like, even if a specific processor modifies an address of a bank, an occurrence of such a data writing error that the register designation serial data is recorded in a completely different register can be avoided.

It is possible that only one processor is formed in one chip, though this is not shown in relation to the embodiment shown in FIG. 2. In this special case, when other serial data is mixed due to an interrupt caused by an external timer, an address of a bank may be modified. In the data processing system according to the present invention, when serial data transferred in order of issuance of a data output instruction from one processor or issuance thereof responsive to an external interrupt is processed, bank designation serial data included in the serial data is temporarily held in a register. A designative value represented by current bank designation serial data that is currently held is compared with a designative value represented by the last bank designation serial data that is immediately previously held. If the designative value of the current bank designation serial data agrees with the designative value of the last bank designation serial data, the current bank designation serial data is not transmitted but register designation serial data paired with the current bank designation serial data is transmitted.

Therefore, according to the foregoing embodiment, even when other serial data is mixed by one processor, or due to an external interrupt, and then transferred, an amount of bank designation serial data is smaller than a conventional one, and the time required for transfer of serial data is shorter than a conventional one. Consequently, recording of data in a register in a chip other than a chip accommodating one processor can be speeded-up. Furthermore, even in this case, similarly to the embodiment described in conjunction with FIG. 2, current bank designation serial data is compared with the last bank designation serial data in order to verify whether or not the current bank designation serial data should be transmitted. When register designation serial data is transmitted to other chip, even if an address of a bank is modified due to an external interrupt, an occurrence of such a data writing error that the register designation serial data is recorded in a completely different register can be avoided.

Figure 3:
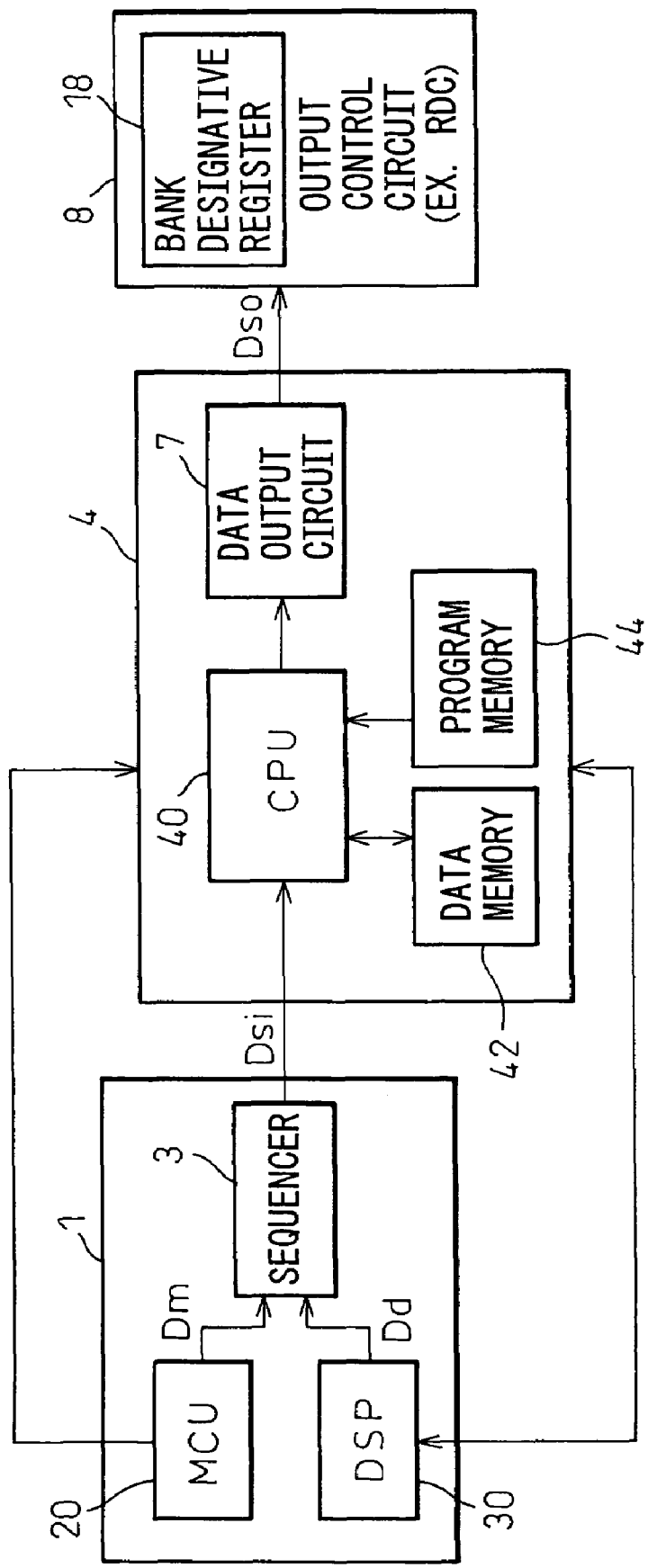
FIG. 3 is a block diagram showing the configuration of a concrete example of the data processing system in accordance with the present invention.

FIG. 3 is a block diagram showing the configuration of a concrete example of the data processing system in accordance with the present invention. Even in this drawing, the configuration of the data processing system in accordance with the present invention for processing serial data transferred from two processors included in a disk drive or the like is shown schematically.

Even in the data processing system of the concrete example shown in FIG. 3, similarly to the one shown in FIG. 2, a control unit 1 that controls various motions including reading and writing motions performed in the disk drive is constructed as one chip. The control unit 1 comprises, as described in conjunction with FIG. 1, an MCU 20 that is one processor, a DSP 30 that is the other processor, and a sequencer 3 that transfers data sent from the MCU 20 and DSP 30 over a common serial bus B. The MCU 20 processes parallel data so as to convert it into serial data Dm, and transfers the serial data Dm to the sequencer 3. The DSP 30 performs arithmetic operations on parallel data so as to convert it into serial data Dd, and transfers the serial data Dd to the sequencer 3. The sequencer 3 transfers serial data Dsi in units of a block over the serial bus B in order of issuance of a data output instruction from the MCU 20 and DSP 30.

Furthermore, even the data processing system shown in FIG. 3 comprises, similarly to the one shown in FIG. 2, a data output processing unit 4 that processes and transmits the serial data Dsi transferred from the sequencer 3 over the serial bus B. The data output processing unit 4 is normally formed in the chip with which the control unit 1 is constructed but may be formed outside the chip.

Furthermore, the output processing unit 4 comprises, similarly to the one shown in FIG. 2, a data output circuit 7 serving as a buffer circuit that mediates between one chip and another chip. The data output circuit 7 has the same circuitry as the data output circuit shown in FIG. 2. Herein, the iterative description of the data output circuit will be omitted.

However, the data output processing unit 4 shown in FIG. 3 is different from the one included in the embodiment shown in FIG. 2 in a point that a CPU 40 included in a computer realizes the capabilities of the second serial data holding means 5 (see FIG. 2) and the second serial data comparing means 6 (see FIG. 2). Specifically, the CPU 40 reads a data processing program from a program memory 44 formed with a read-only memory (ROM) or the like, also reads various kinds of data required for running the program from a data memory formed with a random access memory (RAM), and runs the program. Thus, facilities equivalent to the second serial data holding means 5 and second serial data comparing means 6 are realized.

To be more specific, the program stored in the program memory 44 included in the data output processing unit shown in FIG. 3 comprises: a step of temporarily holding bank designation serial data included in serial data transferred from one processor or a plurality of processors; a step of comparing a designative value represented by current bank designation serial data, which is currently held, with a designative value represented by the last bank designation serial data that is immediately previously held; and a step of, if the designative value of the current bank designation serial data is verified to agree with the designative value of the last bank designation serial data, transmitting only register designation serial data paired with the current bank designation serial data without transmitting the current bank designation serial data.

Figure 9:
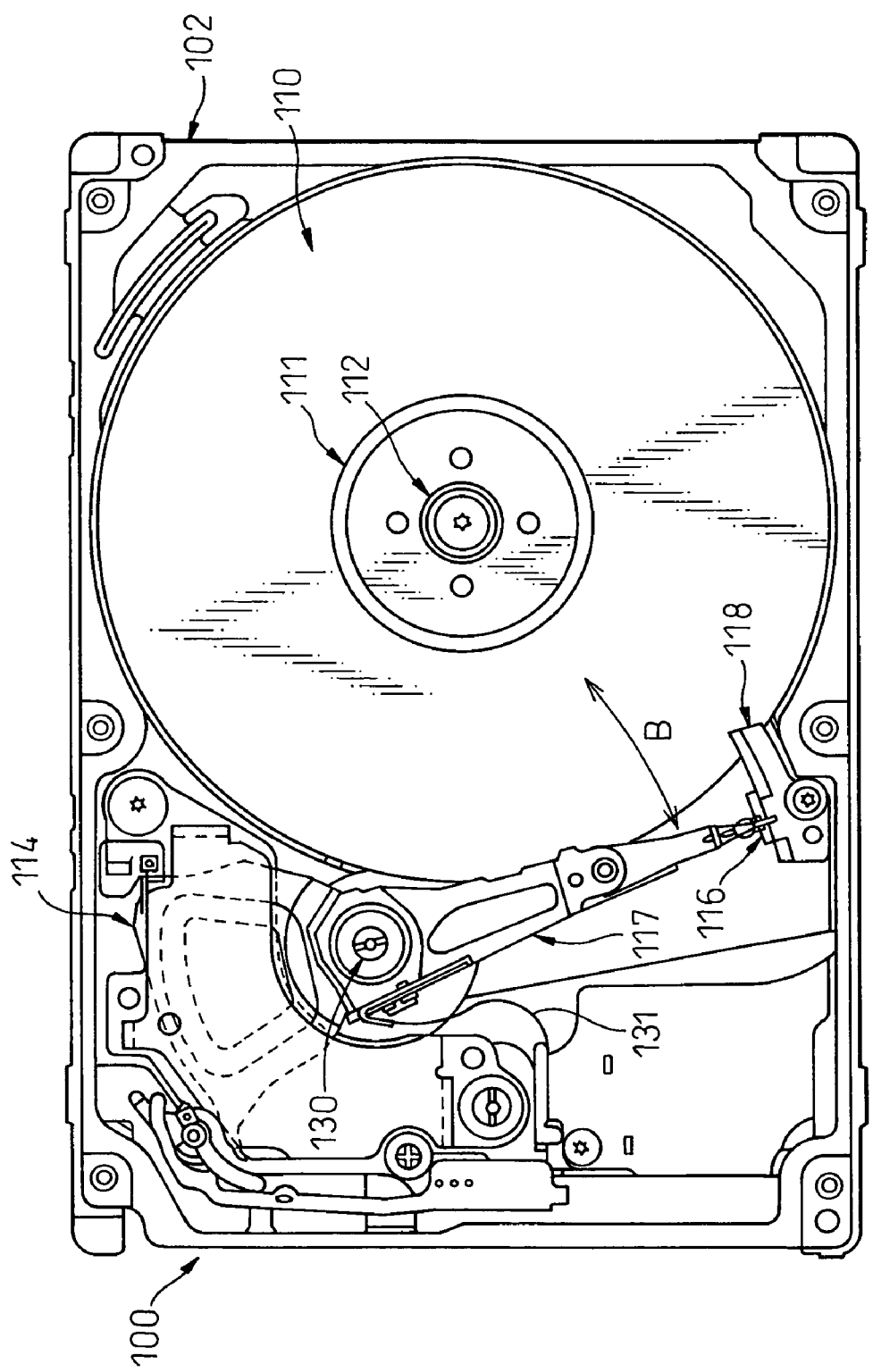
FIG. 9 is a plan view schematically showing the construction of a mechanical unit included in a disk drive to which the present invention is applied.

Furthermore, in the concrete example shown in FIG. 3, when the data processing system is operated using a computer-readable storage medium (or recording medium), a storage medium holding the contents of the foregoing program (for example, a disk 110 such as a hard disk incorporated in a disk drive shown in FIG. 9) is preferably prepared.

The storage medium employed in the concrete example shown in FIG. 3 is not limited to the above one. Alternatively, a floppy disk, a magneto-optical disk (MO), a compact disk-recordable (CD-R) disk, a compact disk read-only memory (CD-ROM) or any other portable medium, a fixed medium, or any other type of storage medium will be employed.

On the other hand, as a result of comparison of the designative values of the two bank designation serial data items, the CPU 40 may verify that the designative value of the current bank designation serial data Dbc disagrees with the designative value of the last bank designation serial data Dbp. In this case, similarly to the conventional data processing system, the current bank designation serial data is transmitted from the data output circuit 7, and register designation serial data paired with the current bank designation serial data is transmitted from the data output circuit 7.

Furthermore, the serial data sent from the data output circuit 7 is, similarly to the one shown in FIG. 2, transmitted to an output control circuit 8 formed in other chip. The output control circuit 8 has the same circuitry as the output control circuit shown in FIG. 2. Herein, the iterative description of the output control circuit will be omitted.

According to the concrete example shown in FIG. 3, even if serial data items are transferred from the two processors (MCU and DSP) while being mixed, an amount of bank designation serial data is smaller than a conventional one and the time required for transfer of serial data is shorter than a conventional one. Consequently, recording of serial data in the output control circuit that is a read channel or the like can be speeded-up. Moreover, according to the concrete example shown in FIG. 3, the facility for comparing current bank designation serial data with the last bank designation serial data so as to verify whether or not the current bank designation serial data should be transmitted is realized by software installed in a computer. The circuit scale of the data processing system may be smaller than that of the data processing system shown in FIG. 2.

FIG. 4 shows examples of data formats for serial data employed in the embodiment of the present invention.

Portion (a) of FIG. 4 shows a data format for serial data of twenty bits that is serial data to be transferred in units of a block from a main memory accessible to a processor in one chip. The serial data of twenty bits comprises address data of eleven bits (that is, address bits) (representing a memory location expressed with a hexadecimal number ranging from 08 to 12), register data of eight bits (representing a memory location expressed with a hexadecimal number ranging from 00 to 07), and one bit for use in controlling reading or writing (R/W bit: associated with a memory location expressed with a hexadecimal number of 13). In the serial data of twenty bits, the four high-order bits of the address data are fixed, but the seven low-order bits thereof are changeable, and the eight data bits are changeable. Assuming that ten blocks of such serial data are transmitted to another chip, it takes a long time, calculated simply as a product of 20 bits by ten serial clock cycles, to record the serial data blocks in registers or the like in another chip.

On the other hand, portion (b) of FIG. 4 shows a data format for serial data of sixteen bits that is serial data to be transferred in units of a block from a main memory accessible to a processor in one chip. In the portion (b) of FIG. 4, in order to use part of the serial data as bank data, the four high-order bits are separated from the address data. The four high-order bits of the address data are used to designate an address of a bank (a bank in which serial data of 16 bits is stored). Seven bits are used as address bits to designate a register in other chip.

The serial data of sixteen bits comprises address data of seven bits (representing a memory location expressed with a hexadecimal number ranging from 08 to 0E), register data of eight bits (representing a memory location expressed with a hexadecimal number ranging from 00 to 07), and one bit for use in controlling reading or writing (R/W bit: associated with a memory location expressed with a hexadecimal number of 0F). The four high-order bits of the address bits are fixed, but the seven low-order bits thereof are changeable, and the eight data bits are changeable. First, an address of a bank in which sixteen bits are stored is designated. Thereafter, it takes only the time, calculated simply as a product of sixteen bits by ten serial clock cycles, to record the serial data in registers. As for the serial data of sixteen bits, only when the address bits representing a memory location ranging from 08 to 0E are all set to "1", is register designation data regarded as a bank designative value indicating an address of a bank.

In short, when all ten blocks of serial data of twenty bits transferred from one chip (register designation serial data) are recorded in registers in another chip, it takes the time, calculated simply as the time required for registering two hundreds bits. On the other hand, when part of the serial data (for example, four bits) is used as serial data (bank designation serial data) with which an address of a bank is designated, it takes the time, calculated simply as the time required for registering one hundred and sixty bits. Therefore, when part of the serial data is treated as bank data, the time required for registering the serial data is shortened.

Figure 5:
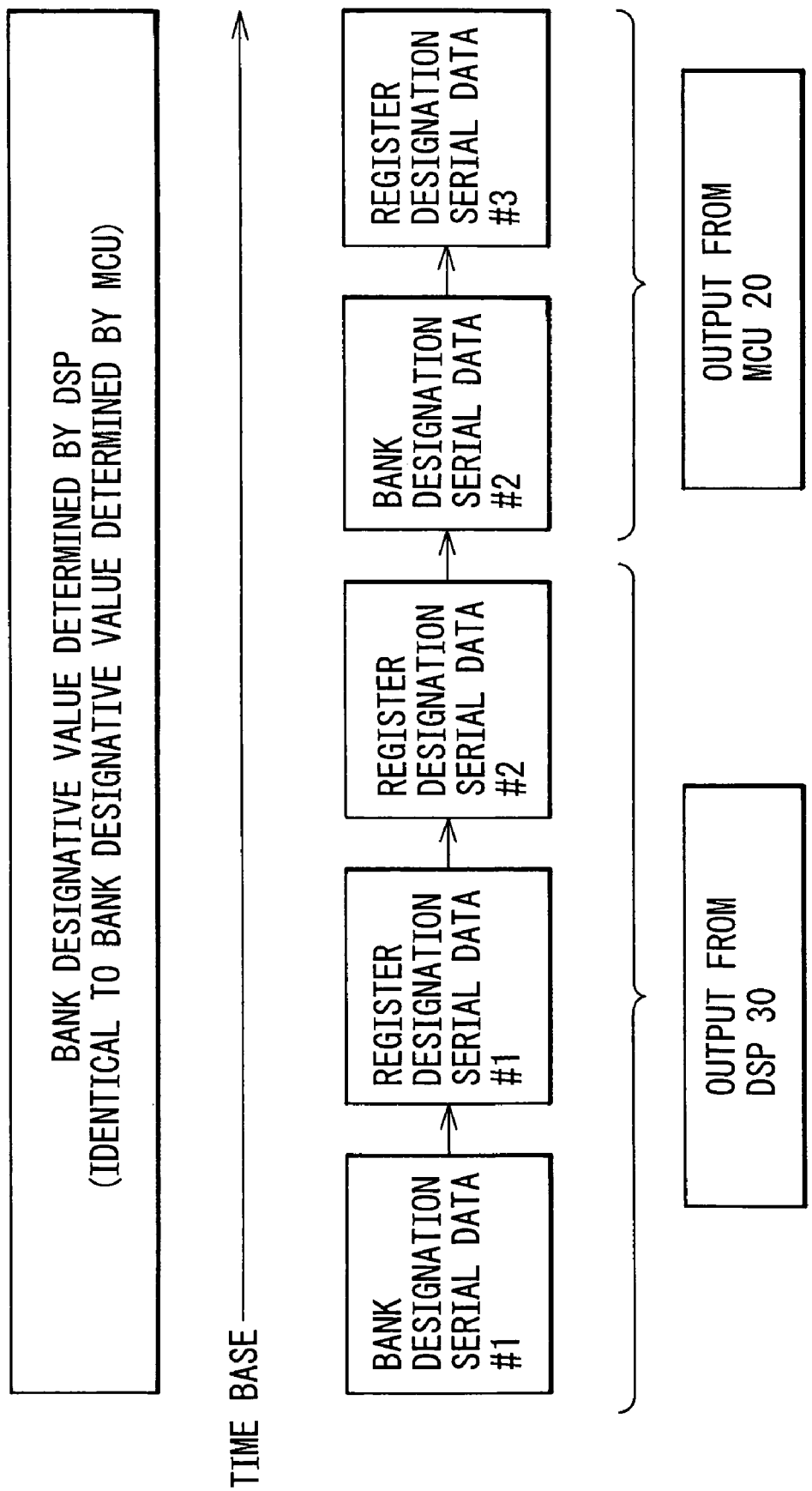
FIG. 5 is a data flow diagram showing the state in which serial data is transmitted in the conventional data processing system.
Figure 6:
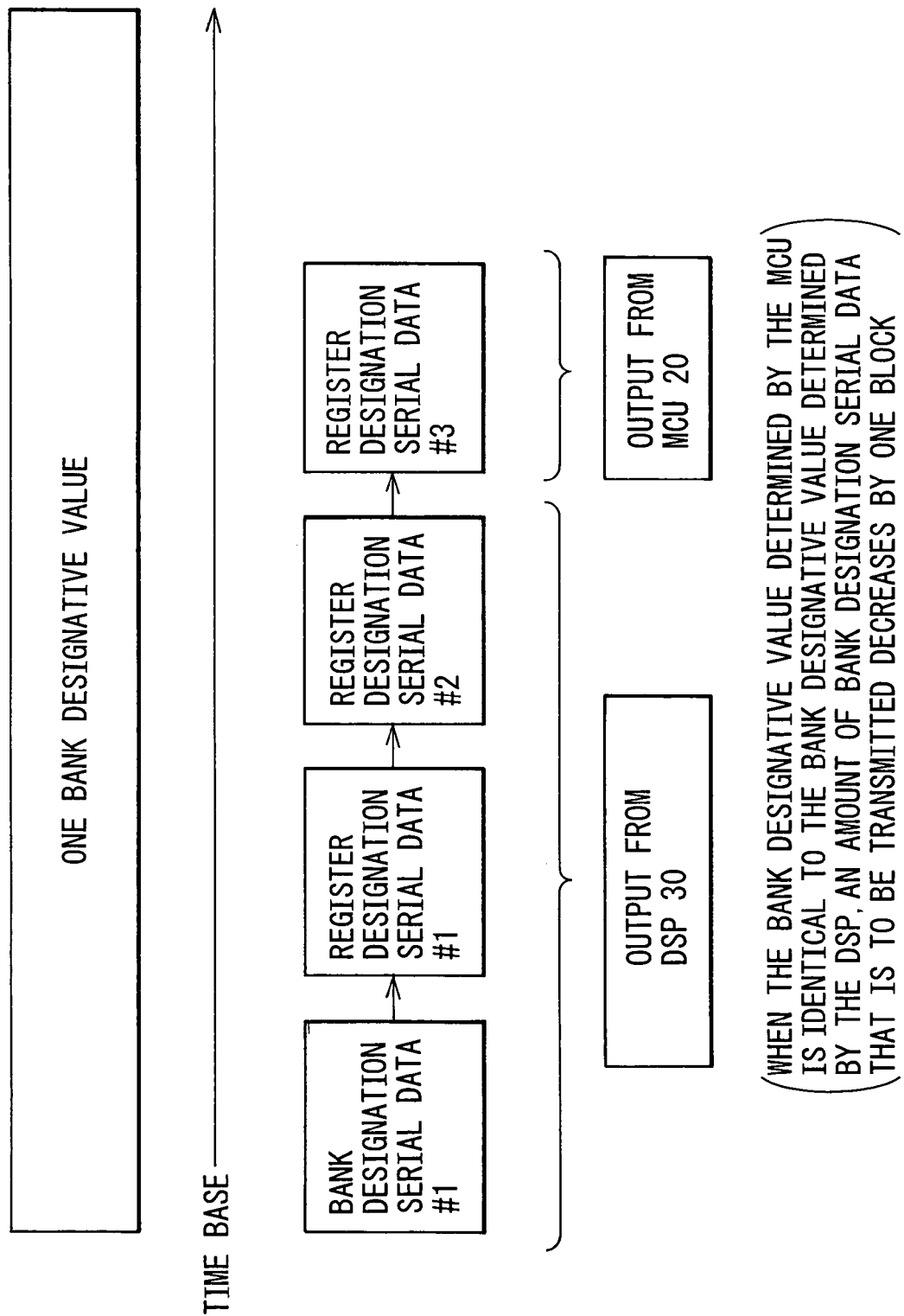
FIG. 6 is a data flow diagram (part 1) showing the state in which serial data is transmitted in the data processing system in accordance with the present invention.
Figure 7:
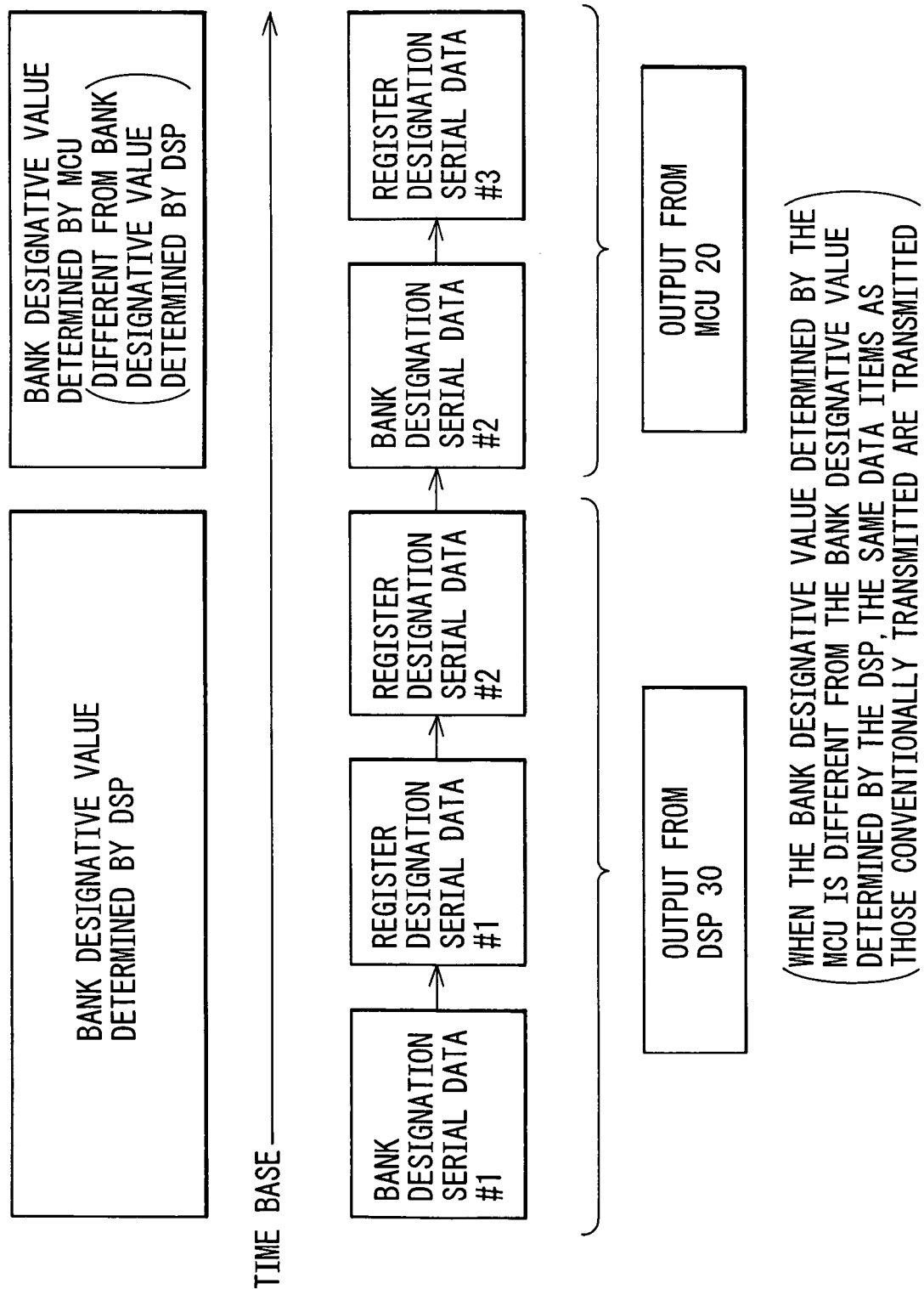
FIG. 7 is a data flow diagram (part 2) showing the state in which serial data is transmitted in the data processing system in accordance with the present invention.

FIG. 5 is a data flow diagram showing the transfer of serial data in the conventional data processing system. FIG. 6 is a data flow diagram (part 1) showing the transfer of serial data in the data processing system in accordance with the present invention. FIG. 7 is a data flow diagram (part 2) showing the transfer of serial data in the data processing system in accordance with the present invention.

FIG. 5 to FIG. 7 outline the flow of data along a time base so as to illustratively show the transfer of serial data performed in units of a block in order of issuance of a data output instruction from two processors of the MCU and DSP. The serial data is, as described previously, composed of register designation serial data that is used to record data in a register included in a read channel (RDC) or the like employed in a disk drive, and bank designation serial data with which an address of a bank is designated. Herein, the data output instruction is issued from the MCU after it is issued from the DSP.

FIG. 5 shows the flow of data in a case in which serial data is transferred in units of a block in order of issuance of a data output instruction from the MCU 20 and DSP 30 in the conventional data processing system (refer to, for example, FIG. 1). Herein, first, bank designation serial data 1 output from the DSP 30 is transferred in response to the data output instruction issued from the DSP 30. Thereafter, register designation serial data 1 and register designation serial data 2 are successively transferred from the DSP 30. At this time, the register designation serial data 1 and register designation serial data 2 each contains data representing the same bank address (bank designative value) which is reflected on the bank designation serial data 1. Thus, a bank designative value determined once is preserved in the form of the bank designation serial data. When numerous register designation serial data items are successively transferred from one processor (DSP), the initially determined bank designative value is valid.

Consequently, in general, when numerous register designation serial data items containing the same bank designative value are transferred from one processor without having register designation serial data containing any other bank designative value mixed therein, it leads to a decrease in an amount of transferred serial data.

However, the conventional data processing system includes two instructing structures (MCU and DSP) that instruct output of serial data. Each of the instructing structures designates an address of a bank. For example, referring to FIG. 5, after the register designation serial data 2 is transferred from the DSP 30, bank designation serial data 2 output from the MCU 20 is transferred in response to a data output instruction issued from the MCU 20. Thereafter, register designation serial data 3 is transferred from the MCU 20. In this case, the register designation serial data 3 is reflected on the bank designation serial data 2.

In the conventional data processing system, each processor cannot recognize information on a bank designative value represented by bank designation serial data transferred from the other processor. Furthermore, as serial data is transferred in real time, each of the processors cannot notify the other processor of the information on the bank designative value. Consequently, in the conventional data processing system, when serial data is recorded in a register included in a read channel or the like, even if the bank designative values represented by the bank designation serial data items transferred from the respective processors are identical to each other, the processors transfer the respective bank designation serial data items without fail before transferring register designation serial data.

On the other hand, FIG. 6 shows the flow of data attained in a case in which serial data is transferred in units of a block in order of issuance of a data output instruction from the MCU 20 and DSP 30 in the data processing system in accordance with the present invention (see, for example, FIG. 3). Herein, first, bank designation serial data 1 output from the DSP 30 is transferred in response to the data output instruction issued from the DSP 30. Thereafter, register designation serial data 1 and register designation serial data 2 are successively transferred from the DSP 30.

In the data processing system according to the present invention, a bank designative value represented by the bank designation serial data 1 output from the DSP 30 is temporarily held in a serial register included in the data output processing unit 4 (see FIG. 2). Referring to FIG. 6, after register designation serial data 2 is transferred, bank designation serial data 2 output from the MCU 20 is transferred in response to the data output instruction issued from the MCU 20. Thereafter, register designation serial data 3 is transferred from the MCU 20. The bank designation serial data 2 is also temporarily held in the serial register or the like included in the data output processing unit 4.

Furthermore, in the data processing system according to the present invention, a digital comparator or the like included in the data output processing unit 4 compares a bank designative value represented by the bank designation serial data 2, which is currently held and transferred from the MCU, with a bank designative value represented by the bank designation serial data 1 that is previously held and transferred from the DSP. As a result, if the bank designative value represented by the current bank designation serial data 2 is verified to agree with the bank designative value represented by the previous bank designation serial data 1, the previous bank designation serial data 2 is not transferred but only the register designation serial data 3 is transferred as shown in FIG. 6.

Consequently, an amount of bank designation serial data that is finally transferred decreases by one block. Eventually, the time required for transfer of serial data is shortened. Thus, recording of data in a register in a read channel or the like can be speeded-up.

On the other hand, as a result of comparison of a bank designative value, which is represented by the bank designation serial data 2 that is currently held, with a bank designative value represented by the bank designation serial data 1 that is previously held, if the designative value represented by the current bank designation serial data 2 is verified to disagree with the bank designative value represented by the previous bank designation serial data 1, after the current bank designation serial data 2 is transferred, the current register designation serial data 3 is transferred as shown in FIG. 7. In this case, serial data is transferred according to the same data flow as the conventional one shown in FIG. 5.

According to the data processing system of the present invention in which data flows shown in FIG. 6 and FIG. 7 are attained, current bank designation serial data 2 is compared with previous bank designation serial data 1 in order to verify whether or not the current bank designation serial data 2 should be transferred. When register designation serial data is transmitted to a read channel or the like, even if a specific processor modifies a bank designative value, such a data writing error that the register designation serial data is recorded in a completely different register can be avoided.

Now, a description will be made of a concrete case in which serial data is processed using a format for serial data of sixteen bits defined in conjunction with FIG. 4(b).

Bank designation serial data is transferred once to represent a bank designative value of 71 as an initial value.

First, one processor (for example, DSP) determines a bank designative value of 72 that is contained in serial data, and determines an output value of register designation serial data of 4F. The determined bank designative value of 72 disagrees with the last bank designative value of 71. Therefore, first, the bank designative value of 72 is adopted as a bank designative value represented by bank designation serial data transferred from one processor, and the bank designation serial data is transmitted over the serial bus. Moreover, the register designation serial data having the output value of 4F is transmitted.

Furthermore, the other processor (for example, MCU) determines a bank designative value of 72 that is contained in serial data, and determines an output value of register designation serial data of 6E.

In this case, as the immediately preceding bank designative value is 72, the bank designation serial data produced by the other processor and representing the bank designative value of 72 is not transmitted, but only the register designation serial data having the output value of 6E is transmitted.

In the above case, F is recorded in a register designated with the bits of address data that represent 4 as a memory location in bank 2, and E is recorded in a register designated with the bits of address data that represent 6 as a memory location in bank 2. In this case, the bank designation serial data and register designation serial data produced by one processor, and the register designation serial data produced by the other processor are successively transmitted.

Figure 8:
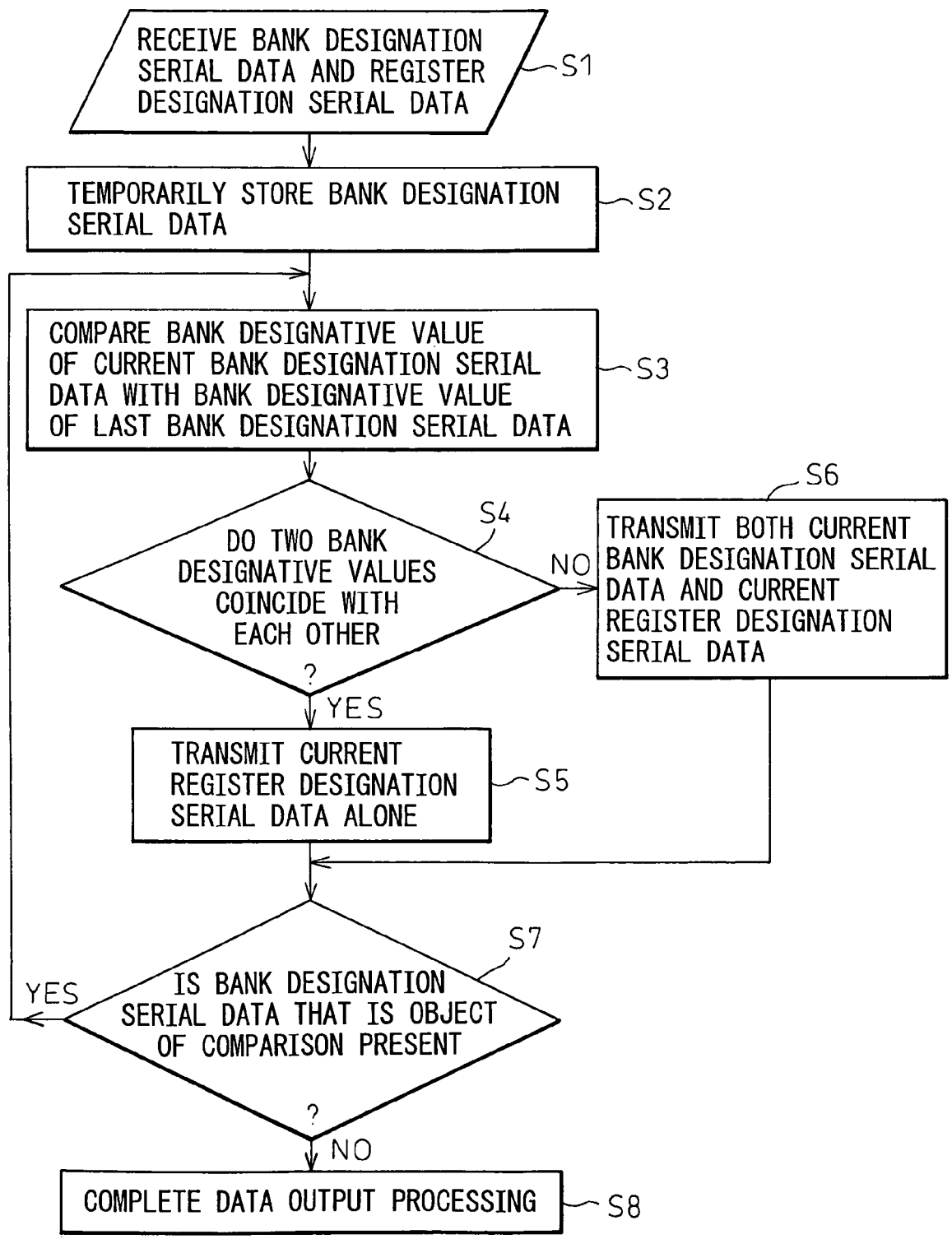
FIG. 8 is a flowchart for explaining processing of serial data performed in the embodiment of the present invention.

FIG. 8 is a flowchart for explaining a sequence of processing serial data according to the present embodiment of the present invention. Herein, a description will be made of a sequence of processing serial data by starting the CPU (see FIG. 3) included in the data output processing unit (see FIG. 3).

First, at step S1, bank designation serial data and register designation serial data are transferred from a plurality of processors to the data output processing unit. Thereafter, at step S2, the bank designation serial data is temporarily held in a serial register or the like.

Furthermore, at step S3, a bank designative value represented by the current bank designation serial data that is currently recorded is compared with a bank designative value represented by the last bank designation serial data that is immediately previously recorded.

At step S4, it is verified whether or not the bank designative value of the current bank designation serial data coincides with the bank designative value of the last bank designation serial data.

If the two bank designative values are verified to coincide with each other, the current bank designation serial data is not transmitted at step S5 but the current register designation serial data alone is transmitted.

On the other hand, if the two bank designative values are verified not to coincide with each other, both the current bank designation serial data and the current register designation serial data are transmitted.

Furthermore, at step S7, it is verified whether or not the next bank designation serial data whose bank designative value is an object of comparison is present. If the next bank designation serial data is present, the foregoing steps S3 to S6 are repeated. If the next bank designation serial data is absent, data processing executed by the data output processing unit is completed (step S8).

Figure 10:
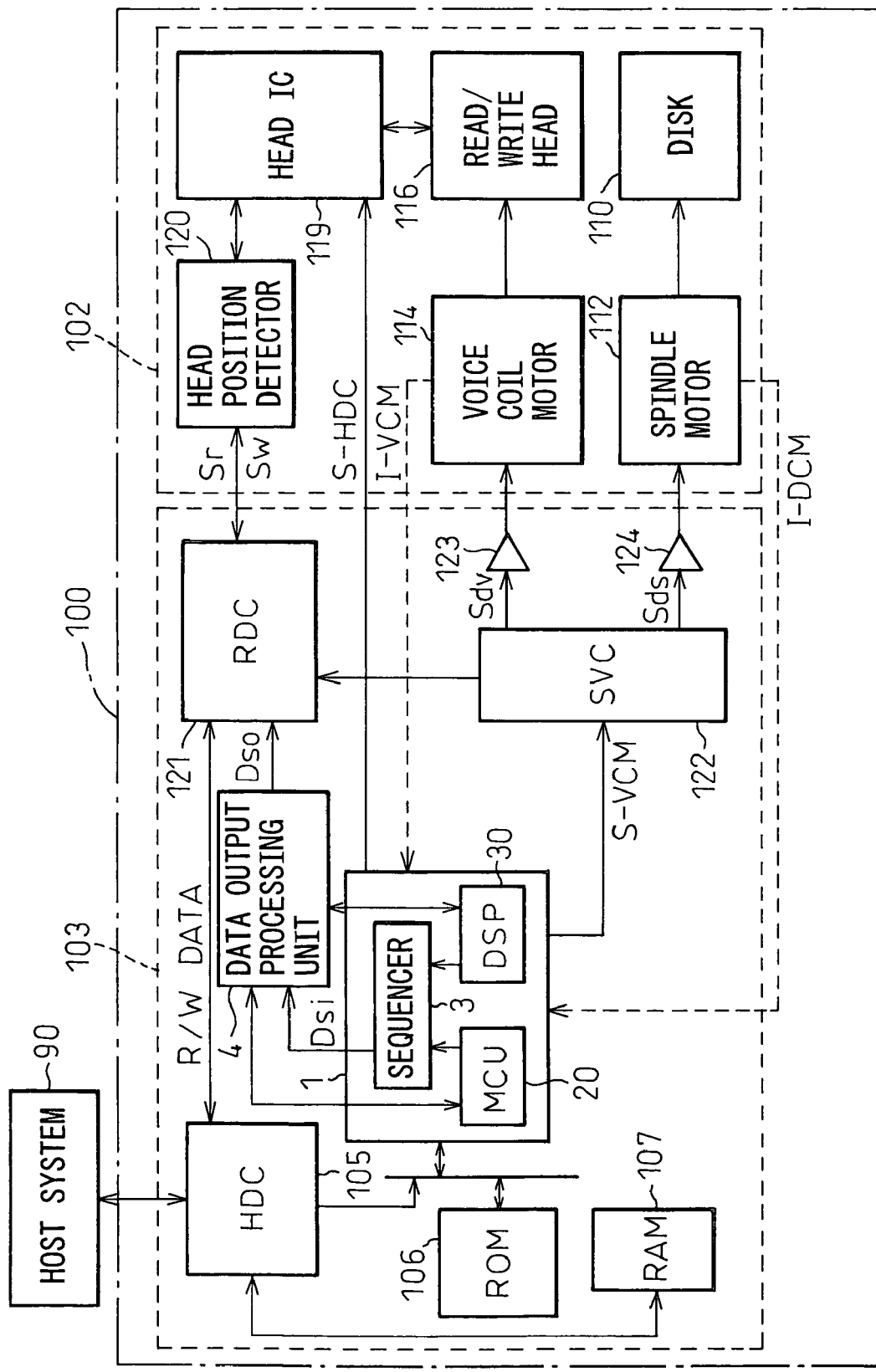
FIG. 10 is a block diagram schematically showing the configuration of a printed-circuit assembly included in the disk drive to which the present invention is applied.

FIG. 9 is a plan view schematically showing the construction of a mechanical unit of a disk drive to which the present invention is applied. FIG. 10 is a block diagram schematically showing the configuration of a printed-circuit assembly incorporated in the disk drive to which the present invention is applied.

Herein, shown, as the disk drive to which the data processing system in accordance with the present invention is applied, is a disk drive 100, such as a magnetic disk drive, having a head that writes or reads information (data) in or from a rotating disk 110, such as a hard disk. The disk drive 100 includes as the head a read/write head 116 having a reading head element and a writing head element integrated with each other.

The disk drive 1 shown in FIG. 9 broadly comprises a mechanical unit 102 including the disk 110, the read/write head 116, a spindle motor 112, and a voice coil motor 114, and a printed-circuit assembly 103 on which an electronic control circuit for controlling a data writing motion and a data reading motion performed by the read/write head 116. Herein, the mechanical unit 102 is enclosed in a disk enclosure, and the electronic control circuit is composed of a plurality of semiconductor devices mounted on the printed-circuit assembly 103 (see FIG. 10). In the mechanical unit 102, the rotating disk 110 that is a single hard disk or includes a plurality of hard disks and that is driven to rotate by the spindle motor 112 coupled to a spindle 111 is disposed coaxially to the spindle motor 112.

The motion of the spindle motor 112 is controlled by a servo controller 122 (see FIG. 10) (abbreviated to SVC in FIG. 10). A plurality of tracks (or a plurality of cylinders) is formed on a magnetic recording surface that is the face (or back) of the disk 110. A data pattern representing predetermined data is written in a sector located at any position on any of the tracks.

What is referred to as a cylinder is a set of multiple tracks on a plurality of layered disks that are superposed on one another in a vertical direction and that can be accessed simultaneously by a plurality of read/write heads.

To be more specific, in disk drives adopting a servo-surface servo technique, the magnetic recording surface of one of the multiple disks 110 serves as a servo surface having a servo signal pattern, which represents a servo signal for servo control, formed thereon. The magnetic recording surfaces of the other disks all serve as data surfaces having a data pattern formed thereon. On the other hand, in disk drives adopting a data-surface servo technique, both the data pattern and servo signal pattern are formed on each of the magnetic recording surfaces of the multiple disks. Recently, the latter disk drive adopting the data-surface servo technique tends to be adopted generally.

Furthermore, the disk drive 100 shown in FIG. 9 includes the read/write head 116 that writes data at any position on the magnetic recording surface of the disk 110, and reads data written at any position on the magnetic recording surface. The read/write head 116 is fixed to the distal end of a head supporting arm 117. The arm 117 is driven by the voice coil motor 114 that is controlled by the servo controller 122 (see FIG. 10) so that the arm 117 will reciprocate between an innermost position on the disk 110 and an outermost position thereon. Consequently, all sectors in a data field on the magnetic recording surface of the disk in which data is written can be accessed. For smooth reciprocation of the arm 117, a pivot bearing 130 is attached to the center of the voice coil motor 114.

For example, when the arm 117 pivots in directions of arrow B by means of the voice coil motor 114, the read/write head 116 moves in radial directions on the disk 110 and can thus scan a desired track. An assembly including the voice coil motor 114 and arm 117 may be called a head actuator. A flexible printed-circuit board (normally abbreviated to FPC) 131 is attached to the head actuator. A servo signal Sdv (see FIG. 10) with which the motions of the voice coil motor 114 and read/write head 116 are controlled is supplied by way of the flexible printed-circuit board 131.

A ramp mechanism 118 is disposed near the periphery of the disk 110. The ramp mechanism 118 is engaged with the distal end of the arm 117, whereby the read/write head 116 is held away from the disk 110.

Furthermore, the disk drive 100 comprises an interface connector (not shown) via which the printed-circuit assembly 103 (see FIG. 10) incorporated in the disk drive 100 is connected to an external host system 90 (see FIG. 10).

Referring to FIG. 10, a description will be made of the configuration of the printed-circuit assembly 103 incorporated in the disk drive to which the data processing system in accordance with the present invention is applied.

As shown in FIG. 10, a reproduction signal read from the disk 110 by the read/write head 116 is fed to a head IC 119 incorporated in the disk enclosure. The signal is then detected and amplified by a head position detector 120, and then fed to an electronic control circuit on the printed-circuit assembly 113.

Furthermore, as shown in FIG. 10, the data processing system in accordance with the present invention shown in FIG. 3 is implemented in the printed-circuit assembly 103 together with a read channel (abbreviated to RDC in FIG. 10) 121 serving as an output control circuit. The read channel 121 has an ability to demodulate data information and servo information from a reproduction signal Sr fed from the head IC 119.

In the data processing system implemented in the printed-circuit assembly 103, as described in conjunction with FIG. 3, a control unit 1 that controls various motions including data reading and writing motions according to servo information sent from the read channel 121 is constructed with one chip. Positional information on the position of a track on a disk surface in which the read/write head 116 is located can be sampled from the servo information. The control unit 1 comprises an MCU 20 that is one processor, and a DSP 30 that is the other processor, and a sequencer 3 that transfers data sent from the MCU 20 and DSP 30 over a common serial bus. The MCU 20 processes parallel data so as to convert it into serial data, and then transfers the serial data to the sequencer 3. The DSP 30 performs arithmetic operations on parallel data so as to convert it into serial data, and then transfers the serial data to the sequencer 3.

Furthermore, the data processing system comprises, as described in conjunction with FIG. 3, a data output processing unit 4 that processes and transmits serial data Dsi sent from the sequencer 3. The data output processing unit is formed in the chip with which the control unit 1 is constructed, but may be formed outside the chip.

Furthermore, serial data sent from the data output processing unit 4 is transmitted to the read channel 121 on another chip, and is recorded in a bank designative register included in the read channel 121.

As the circuit elements of the electronic control circuit shown in FIG. 10, a hard disk controller (abbreviated to HDC in FIG. 10) 105 that controls motions made in the disk drive 100 according to a command issued from the host system 90, such as a host processor, outside the disk drive 100, a RAM 107 in which data to be read or written is temporarily stored, a ROM 108 in which a program for executing data reading and writing is saved, and a servo controller 122 that controls the motions of the spindle motor 112 and voice coil motor 114 are mounted on the printed-circuit assembly 103. Preferably, a fast-access large-capacity dynamic RAM (normally abbreviated to DRAM) is adopted as the RAM 107.

In the electronic control circuit having the foregoing configuration, when a Write command instructing data writing is issued from the upper-level system 90, the MCU 20 included in the control unit 1 acts according to a program stored in advance in the ROM 108, and transmits a read channel control signal to the read channel 121. The read channel 121 transmits a writing signal Sw to the head IC 19 according to the reading/writing data signal (R/W DATA). The head IC 119 amplifies the writing signal Sw and transfers the resultant signal to the read/write head 116.

On the other hand, when a Read command instructing data reading is issued from the host system 90, the MCU 20 included in the control unit 1 acts according to a program stored in advance in the ROM 108, and transmits a hard disk control signal S-HDC to the head IC 119. The head IC 119 amplifies a reproduction signal sent from the read/write head 116 and transfers the resultant signal to the read channel 121. Based on a writing/reading data signal (R/W DATA), the read channel 121 verifies whether the reproduction signal Sr is read from a sector located at a correct position on a disk. The read channel 121 then transmits servo information, which includes positional information on the position of the sector, to the control unit 1.

Furthermore, the MCU 20 included in the control unit 1 produces a VCM control signal S-VCM, with which the motion of the voice coil motor 114 is controlled, according to the various control signals sent from the upper-level system 90 and the servo information, and then transmits the VCM control signal to the servo controller 122. A servo signal SDv produced based on the VCM control signal S-VCM and supposed to be sent to the voice coil motor is fed to the voice coil motor 114 via a driver 123. The voice coil motor 114 starts in response to the servo signal Sdv (a current I-VCM flows into the voice coil motor 114), whereby a motion such as seek of moving the read/write head 116 to a designated position is carried out. At the same time, the servo signal Sds that is produced based on the VCM control signal S-VCM, and is supposed to be sent to the spindle motor, is fed to the spindle motor 112 via a driver 124. The spindle motor 112 starts responsively to the servo signal Sds (a current I-DCM flows into the spindle motor 112). Consequently, the disk 110 is driven to rotate.

For confirmation, the configuration and action of the data output processing unit 4 employed in the present invention adapted to the disk drive 100 will be briefly described below.

The output processing unit 4 shown in FIG. 10 includes a data output circuit serving as a buffer circuit that mediates between one chip and another chip.

Furthermore, in the data output processing unit 4 shown in FIG. 10, the capabilities of the bank designation serial data holding means (see FIG. 2) and the bank designation serial data comparing means (see FIG. 2) are realized by a CPU included in a computer. Specifically, the CPU reads and runs a data processing program stored in a ROM included in the data output processing unit shown in FIG. 10, whereby facilities equivalent to the bank designation serial data holding means and bank designation serial data comparing means are implemented.

To be more specific, by running a program stored in a ROM or the like included in the data output processing unit shown in FIG. 10, the following steps are executed: a step of temporarily holding bank designation serial data items sent from a plurality of processors (for example, MCU 20 and DSP 30); a step of comparing a designative value represented by current bank designation serial data, which is currently held, with a designative value represented by the last bank designation serial data that is immediately previously held; and a step of, if the bank designative value of the current bank designation serial data is verified to agree with the bank designative value of the last bank designation serial data, transmitting only register designation serial data paired with the current bank designation serial data without transmitting the current bank designation serial data.

On the other hand, if, as a result of comparison of the bank designative values of the two bank designation serial data items, the CPU verifies that the bank designative value of the current bank designation serial data disagrees with the bank designative value of the last bank designation serial data, the current bank designation serial data is transmitted, and the register designation serial data paired with the current bank designation serial data is transmitted.

With regard to the industrial utilization of the present invention, according to the present invention, part of the serial data transferred from a single processor or a plurality of processors formed as one chip over a common serial bus is used as bank data. Therefore, the present invention can be applied to a data storage device such as a magnetic disk drive or a magneto-optical disk drive including a data processing system that processes the data and transmits it to an output control circuit formed as a read channel or the like in another chip.

The invention claimed is:

1. A data processing system including a data output processing unit that processes and transmits serial data transferred in units of a block over a common serial bus in order of issuance of a data output instruction from a plurality of processors, wherein:
    the serial data includes register designation serial data containing usable information, and bank registration serial data with which an address of a bank, in which the register designation serial data is stored, is designated;
    the data output processing unit comprises a bank registration serial data holding means for temporarily holding the bank registration serial data included in the serial data transferred from the plurality of processors, and a bank registration serial data comparing means for comparing a designative value represented by current bank registration serial data, which is currently held in the bank registration serial data holding means, with a designative value represented by the last bank registration serial data that is immediately previously held in the bank registration serial data holding means;
    if the bank registration serial data comparing means verifies that the designative value of the current bank registration serial data agrees with the designative value of the last bank registration serial data, the current bank registration serial data is not transmitted but only the register designation serial data included in the block including the current bank registration serial data is transmitted.

2. The data processing system according to claim 1, wherein, if the bank registration serial data comparing means verifies that the designative value of the current bank registration serial data disagrees with the designative value of the bank registration serial data, both the current bank registration serial data and the register designation serial data included in the block including the current bank registration serial data are transmitted.

3. A data processing system including a data output processing unit that processes and transmits serial data transferred in units of a block over a serial bus in order of issuance of a data output instruction from one processor or issuance of a data output instruction responsive to an external interrupt, wherein:
    the serial data includes register designation serial data containing usable information, and bank registration serial data with which an address of a bank, in which the register designation serial data is stored, is designated;
    the data output processing unit comprises a bank registration serial data holding means for temporarily holding the bank registration serial data included in the serial data transferred from the processor, and a bank registration serial data comparing means for comparing a designative value represented by current bank registration serial data, which is currently held in the bank registration serial data holding means, with a designative value represented by the last bank registration serial data that is immediately previously held in the bank registration serial data holding means; and
    if the bank registration serial data comparing means verifies that the designative value of the current bank registration serial data agrees with the designative value of the bank registration serial data, the current bank registration serial data is not transmitted but only the register designation serial data included in the block including the current bank registration serial data is transmitted.

4. The data processing system according to claim 3, wherein if the bank registration serial data comparing means verifies that the designative value of the current bank registration serial data disagrees with the designative value of the current bank registration serial data, both the current bank registration serial data register designation serial data included in the block including the current bank registration serial data are transmitted.

5. A data processing method for processing and transmitting serial data transferred over a serial bus in order of issuance of a data output instruction from at least one processor, wherein the serial data includes register designation serial data containing usable information, and bank registration serial data with which an address bank, in which the register designation serial data is stored, is designated, the data processing method comprising:
    a step of temporarily holding the bank registration serial data included in the serial data transferred from the processor;
    a step of comparing a designative value represented by current bank registration serial data, which is currently held, with a designative value represented by the last bank registration serial data that is immediately previously held; and
    a step of, if the designative value of the current bank registration serial data is verified to agree with the designative value of the last bank registration serial data, transmitting only the register designation serial data included in the block including the current bank registration serial data without transmitting the current bank registration serial data.

6. The data processing method according to claim 5, wherein, if the designative value of the current bank registration serial data is verified to disagree with the designative value of the last bank registration serial data, both the current bank registration serial data and the register designation serial data included in the block including the current bank registration serial data are transmitted.

7. A computer-readable storage medium in which a program is stored, wherein when the program is executed by a computer, the program causes the computer, which processes and transmits serial data on the assumption that the serial data transferred in units of a block over a serial bus in order of issuance of a data output instruction from at least one processor includes register designation serial data containing usable information, and bank registration serial data with which an address bank, in which the register designation serial data is stored, is designated, to:

temporarily hold the bank registration serial data included in the serial data transferred from the processor;

compare a designative value represented by current bank registration serial data, which is currently held, with a designative value represented by the last bank registration serial data that is immediately previously held; and if the designative value of the current bank registration serial data is verified to agree with the designative value of the last bank registration serial data, transmit only the register designation serial data included in the block including the current bank registration serial data without transmitting the current bank registration serial data.

8. A disk drive including a disk driver which drives a disk so that the disk can rotate, a head driver which drives a head so that the head will reciprocate between the innermost position on the disk and the outermost position thereon, and a plurality of processors which controls various motions including a motion of writing information at any position on the disk using the head, and a motion of reading information written at any position, the disk drive comprising:

a data output processing unit that processes and transmits serial data transferred in units of a block over a common serial bus in order of issuance of a data output instruction from the plurality of processors, wherein:

the serial data includes register designation serial data containing usable information and bank registration serial data with which an address of a bank, in which the register designation serial data is stored, is designated;

the data output processing unit comprises a bank registration serial data holding means for temporarily holding the bank registration serial data included in the serial data transferred from the plurality of processors, and a bank registration serial data comparing means for comparing a designative value represented by current bank registration serial data, which is currently held in the bank registration serial data holding means, with a designative value represented by the last bank registration serial data that is immediately previously held in the bank registration serial data holding means; and if the bank registration serial data comparing means verifies that the designative value of the current bank registration serial data agrees with the designative value of the current bank registration serial data, the current bank registration serial data is not transmitted but only the register designation serial data included in the block including the current bank registration serial data is transmitted.

9. The disk drive according to claim 8, wherein, if the bank registration serial data comparing means verifies that the designative value of the current bank registration serial data disagrees with the designative value of the last bank registration serial data, both the current bank registration serial data and the register designation serial data included in the block including the current bank registration serial data are transmitted.

10. A disk drive comprising a disk driver which drives a disk so that the disk can rotate, a head driver which drives a head so that the head will reciprocate between the innermost position on the disk and the outermost position thereon, and one processor which controls various motions including a motion of writing data at any position on the disk using the head, and a motion of reading data written at any position, the disk drive further comprising:

a data output processing unit that processes and transmits serial data transferred in units of a block over a serial bus in order of issuance of a data output instruction from one processor or issuance of a data output instruction responsive to an external interrupt, wherein:

the serial data includes register designation serial data containing usable information and bank registration serial data with which an address of a bank, in which the register designation serial data is stored, is designated;

the data output processing unit comprises a bank registration serial data holding means for temporarily holding the bank registration serial data included in the serial data transferred from the processor, and a bank registration serial data comparing means for comparing a designative value represented by current bank registration serial data, which is currently held in the bank registration serial data holding means, with a designative value represented by the last bank registration serial data that is immediately previously held in the bank registration serial data holding means; and if the bank registration serial data comparing means verifies that the designative value of the current bank registration serial data agrees with the designative value of the last bank registration serial data, the current bank registration serial data is not transmitted but only the register designation serial data included in the block including the current bank registration serial data is transmitted.

11. The disk drive according to claim 10, wherein, if the bank registration serial data comparing means verifies that the designative value of the current bank registration serial data disagrees with the designative value of the last bank registration serial data, both the current bank registration serial data and the register designation serial data included in the block including the current bank registration serial data are transmitted.

\* \* \* \* \*